United States Patent
Wadsworth

(10) Patent No.: US 9,016,178 B2
(45) Date of Patent: Apr. 28, 2015

(54) APPARATUS AND METHOD FOR CUTTING TUBULAR MEMBERS

(76) Inventor: Lewis W. Wadsworth, Goshen, IN (US)

( * ) Notice: Subject to any disclaimer, the term of this patent is extended or adjusted under 35 U.S.C. 154(b) by 333 days.

(21) Appl. No.: 13/004,983

(22) Filed: Jan. 12, 2011

(65) Prior Publication Data

US 2011/0167973 A1 Jul. 14, 2011

Related U.S. Application Data

(60) Provisional application No. 61/294,127, filed on Jan. 12, 2010.

(51) Int. Cl.
| | |
|---|---|
| B23D 25/02 | (2006.01) |
| B31C 11/02 | (2006.01) |
| B31C 99/00 | (2009.01) |
| B26D 7/06 | (2006.01) |
| B26D 3/16 | (2006.01) |
| B26D 1/40 | (2006.01) |

(52) U.S. Cl.
CPC ... *B26D 3/16* (2013.01); *B26D 1/40* (2013.01)

(58) Field of Classification Search
CPC .................................... B26D 3/16; B26D 1/40
USPC ......... 83/19–21, 321, 331, 557, 663, 658, 23, 83/37, 109, 156, 162, 163, 54; 72/209, 72/370.23, 370.24, 31.06, 467, 72/370.1–370.13; 493/288, 302; 198/624, 198/626.3–626.6; 30/90, 90.6, 90.8
See application file for complete search history.

(56) References Cited

U.S. PATENT DOCUMENTS

| | | | | |
|---|---|---|---|---|
| 1,872,384 A | * | 8/1932 | Andren | 72/369 |
| 1,878,985 A | | 9/1932 | Smith | |
| 3,109,663 A | * | 11/1963 | Phillips, Jr. | 72/467 |
| 3,371,770 A | * | 3/1968 | Graham et al. | 198/572 |
| 3,464,251 A | * | 9/1969 | Johns | 72/100 |
| 3,557,596 A | * | 1/1971 | Illert | 2/370.23 |
| 3,648,553 A | | 3/1972 | Tuschy et al. | |

(Continued)

FOREIGN PATENT DOCUMENTS

| | | | |
|---|---|---|---|
| DE | 2116006 | * | 10/1972 |
| DE | 2116006 A1 | | 10/1972 |

(Continued)

OTHER PUBLICATIONS

European Patent Office, International Search Report issued in corresponding international patent application, Mar. 22, 2011, 3 pages.

(Continued)

*Primary Examiner* — Sean Michalski
*Assistant Examiner* — Jonathan G Riley
(74) *Attorney, Agent, or Firm* — Barnes & Thornburg LLP

(57) ABSTRACT

An apparatus for cutting tubular members includes a support structure, a control system, a cutting station, a guide and an extracting assembly. The cutting station includes a first wheel having at least one cutting member located on the circumference of the first wheel and a second wheel having at least one projection located on the circumference of the second wheel. The extracting assembly has a cylindrical member with a first end and a second end. The cylindrical member also includes a pair of grooves extending along a portion of the interior thereof. The grooves decrease in height and depth from the first interior section to the third interior section.

22 Claims, 5 Drawing Sheets

(56) References Cited

U.S. PATENT DOCUMENTS

| | | | | |
|---|---|---|---|---|
| 3,780,944 | A | * | 12/1973 | Zubalik ............................ 239/33 |
| 3,800,645 | A | * | 4/1974 | Alcock et al. .................... 83/198 |
| 4,116,597 | A | * | 9/1978 | Dunstan ......................... 425/110 |
| 4,212,215 | A | | 7/1980 | Buys |
| 4,224,818 | A | * | 9/1980 | Jones et al. ...................... 72/284 |
| 4,398,439 | A | | 8/1983 | Bryan et al. |
| 4,535,662 | A | | 8/1985 | Lynn |
| 5,094,659 | A | * | 3/1992 | Schwartz ....................... 493/309 |
| 5,286,317 | A | | 2/1994 | Treat et al. |
| 5,315,854 | A | * | 5/1994 | Ledebur ........................... 72/297 |
| 5,526,670 | A | * | 6/1996 | Parola .............................. 72/416 |
| 5,722,219 | A | | 3/1998 | Dobransky |
| 5,921,128 | A | * | 7/1999 | Stinnertz et al. ................. 72/214 |
| 5,921,160 | A | * | 7/1999 | Yankaitis et al. ................ 83/109 |
| 6,158,316 | A | | 12/2000 | Ichikawa et al. |
| 6,512,727 | B2 | * | 1/2003 | Garabedian ...................... 369/63 |
| 6,736,409 | B2 | | 5/2004 | Hollenberg |
| 6,810,712 | B2 | * | 11/2004 | Goto ............................... 72/467 |
| 7,107,891 | B2 | * | 9/2006 | Kneppe et al. ................... 83/663 |
| 7,540,181 | B1 | * | 6/2009 | Memmott ....................... 72/467 |
| 7,549,854 | B2 | | 6/2009 | Lipson |
| 7,958,762 | B1 | * | 6/2011 | Wolf ............................... 72/129 |
| 2006/0026930 | A1 | | 2/2006 | Grishchenko et al. |
| 2006/0086228 | A1 | | 4/2006 | Tsaur |
| 2010/0064753 | A1 | * | 3/2010 | Sasaki ............................. 72/208 |
| 2010/0199820 | A1 | * | 8/2010 | Quigley ............................ 83/27 |

FOREIGN PATENT DOCUMENTS

| | | |
|---|---|---|
| JP | 3-130398 U | 12/1991 |
| WO | 97/32717 A1 | 9/1997 |

OTHER PUBLICATIONS

European Patent Office, Written Opinion issued in corresponding international patent application, Mar. 22, 2011, 5 pages.

\* cited by examiner

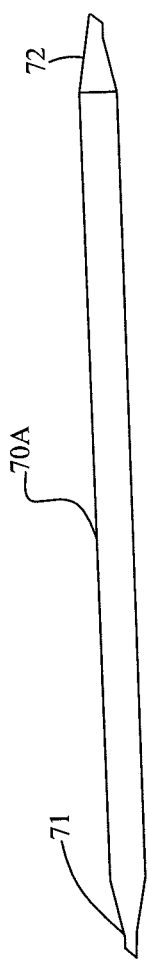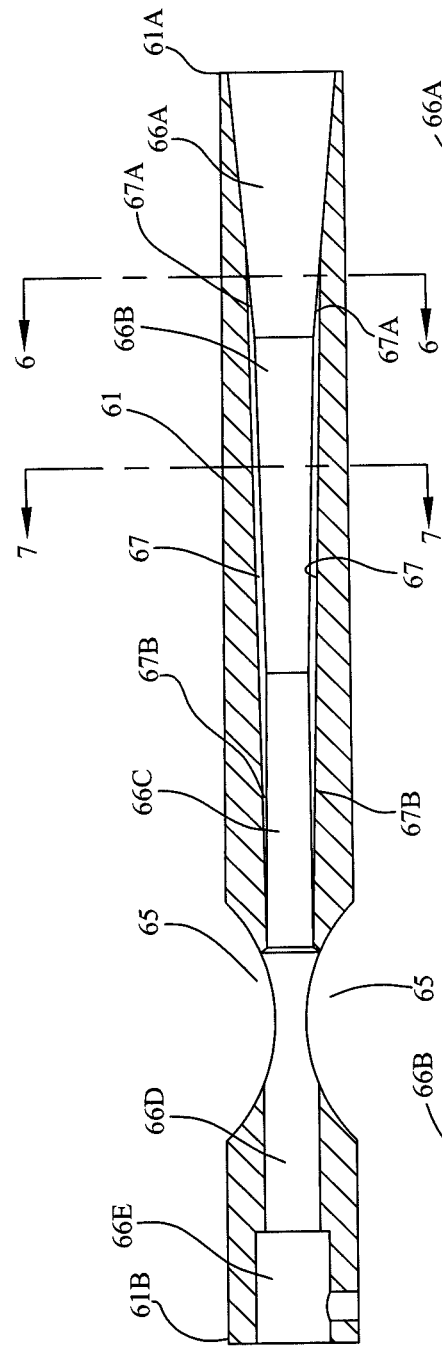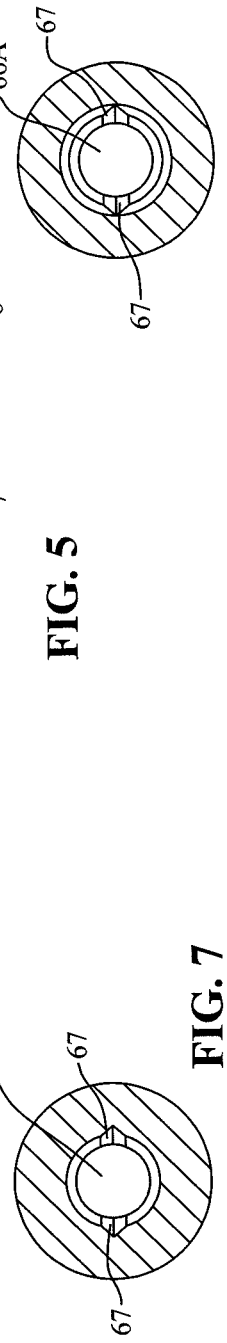

APPARATUS AND METHOD FOR CUTTING TUBULAR MEMBERS

FIELD OF THE INVENTION

The present invention relates to an apparatus for cutting tubular members and, in particular, an apparatus for cutting tubular members as they are continuously produced such as, for example, by an extrusion process.

BACKGROUND AND SUMMARY OF THE INVENTION

Various machines and apparatus for cutting tubular members are known. Examples of these include U.S. Pat. No. 6,736,409 entitled Drinking Straw Prepared From Flattened Polymeric Tubular Conduit, Method of Making Same and Dispenser Therefor; U.S. Pat. No. 7,549,854 entitled Striped Drinking Straw and Method of Making Same, U.S. Pat. No. 4,212,215 entitled Apparatus For Cutting a Tube of Semi-Rigid Material and U.S. Patent Application Publication No. US 2006/0086228 entitled Tube Cutting Process and Device. Devices for packaging or handling cut tubular members are disclosed in U.S. Patent Application Publication No. US 2006/0026930 entitled Dual Head Straw Wrapper and U.S. Pat. No. 3,648,553 entitled Device for Transporting Elongated Work Pieces.

In one embodiment of the present invention, an apparatus for cutting tubular members includes a support structure, a control system, a cutting station, a guide and an extracting assembly. The cutting station includes a first wheel having at least one cutting member located on the circumference of the first wheel and a second wheel having at least one projection located on the circumference of the second wheel. The extracting assembly has a cylindrical member with a first end and a second end. The cylindrical member also includes a first interior section tapering from the first end toward the second end, a second interior section tapering from the end of the first interior section toward the second end of the cylindrical member, a third interior section extending from the end of the first interior section toward the second end of the tubular member and a pair of grooves extending from the first interior section to the third interior section. The grooves decrease in height and depth from the first interior section to the third interior section.

In another embodiment of the present invention, an apparatus for cutting tubular members includes a cutting station and an extracting assembly for ejecting the cut segments of the tubular member from the apparatus. The extracting assembly includes at least one groove for expanding a portion of the cut segments.

In another embodiment of the present invention, an apparatus for cutting tubular members includes a cutting station and an extracting assembly. The cutting station has a first wheel and a second wheel. The first wheel has at least one cutting member located on its circumference. The cutting member has a portion for cutting the tubular member. The second wheel has at least one projection located on its circumference. The first and second wheels are positioned such that the portion for cutting the tubular member and the projection are aligned on opposite sides of the tubular member when it is cut without the portion for cutting the tubular member contacting the projection.

In another embodiment of the present invention, a method of cutting a tubular member, includes the step of introducing a tubular member into an apparatus having a cutting station, the cutting station having a first wheel having at least one cutting member located on the circumference of the first wheel, the cutting member having a cutting portion and a second wheel having at least one projection located on the circumference of the second wheel. The method further includes the steps of guiding the tubular member between the first and second wheels and rotating the first and second wheels such that the cutting portion is positioned opposite the projection and has a tangential speed substantially equal to the linear speed of the tubular member while cutting the member.

BRIEF DESCRIPTION OF THE DRAWINGS

FIG. 5 is a cross-sectional view of a portion of the extracting assembly taken along line 5-5 in FIG. 4.

FIG. 6 is a cross-sectional view taken along line 6-6 in FIG. 4.

FIG. 7 is a cross-sectional view taken along line 7-7 in FIG. 4.

FIG. 8 is a perspective view of a segment of a tubular member cut by the apparatus for cutting tubular members shown in FIG. 1 before it has passed through the extracting assembly.

DETAILED DESCRIPTION OF THE PREFERRED EMBODIMENTS

Figure 1:
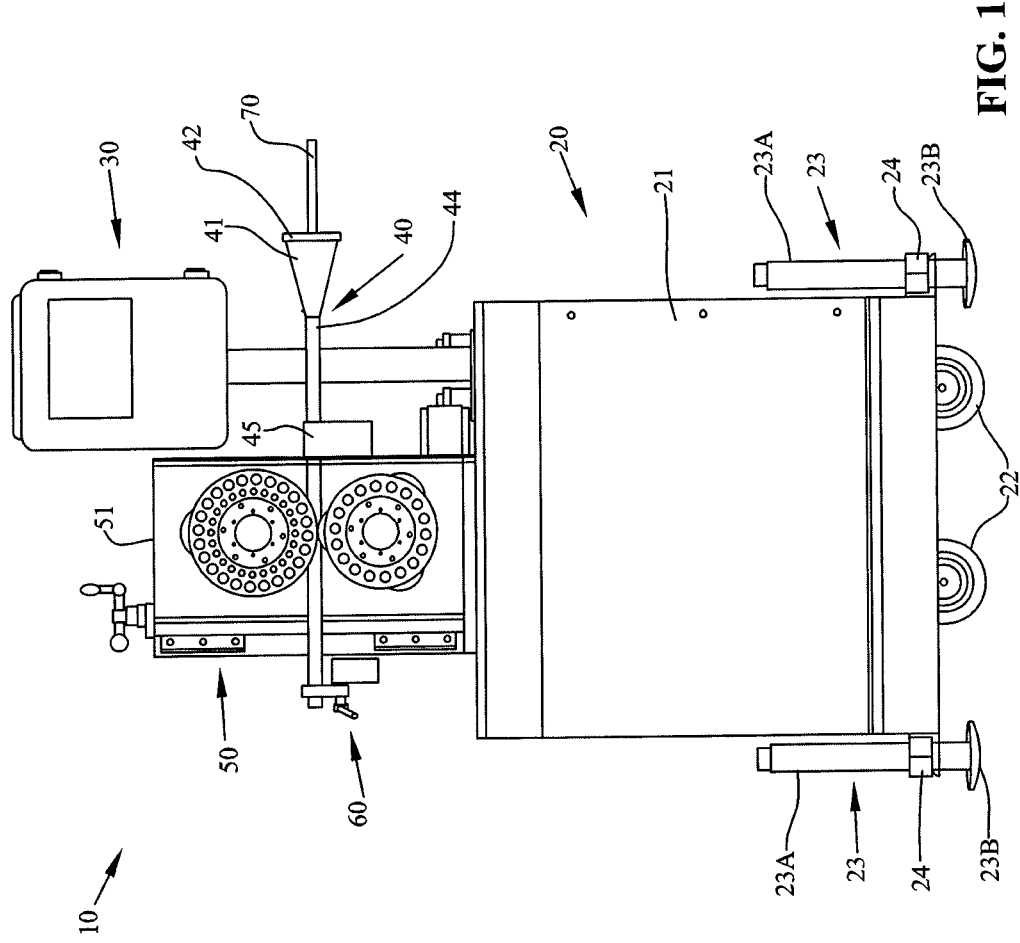
FIG. 1 is a front elevational view of an apparatus for cutting tubular members according to one embodiment of the present invention.

FIG. 1 is a front elevational view of an apparatus for cutting tubular members (also referred to as a tubing cutter) according to one embodiment of the present invention. Tubing cutter 10 generally includes a support structure 20, a control system 30, a guide 40, a cutting station 50 and an extracting assembly 60.

In the embodiment shown, support structure 20 includes a generally box shaped base 21 having a plurality of wheels 22 and a plurality of supports 23. Supports 23 include threaded sections 23A which terminate at one end in feet 23B. Threaded sections 23A extend through nuts 24 on base 21. As will be apparent to one of ordinary skill in the art, supports 23 can be advanced upward through nuts 24 to raise feet 23B, thereby allowing tubing cutter 10 to be moved by rolling it on wheels 22. When tubing cutter 10 is placed in the desired location, supports 23 are advanced in the opposite direction until feet 23B engage the ground and adequately stabilize tubing cutter 10. Base 21 houses certain of the electronic and other components that control the operation of tubing cutter 10 as described below.

Control system 30 includes a variety of controls (not shown) that are the interface through which the operator controls operation of tubing cutter 10. For example, control system 30 can include buttons, switches, knobs and other devices for powering the various components of tubing cutter 10 on and off, changing the operating speed and controlling other functions.

Figure 3:
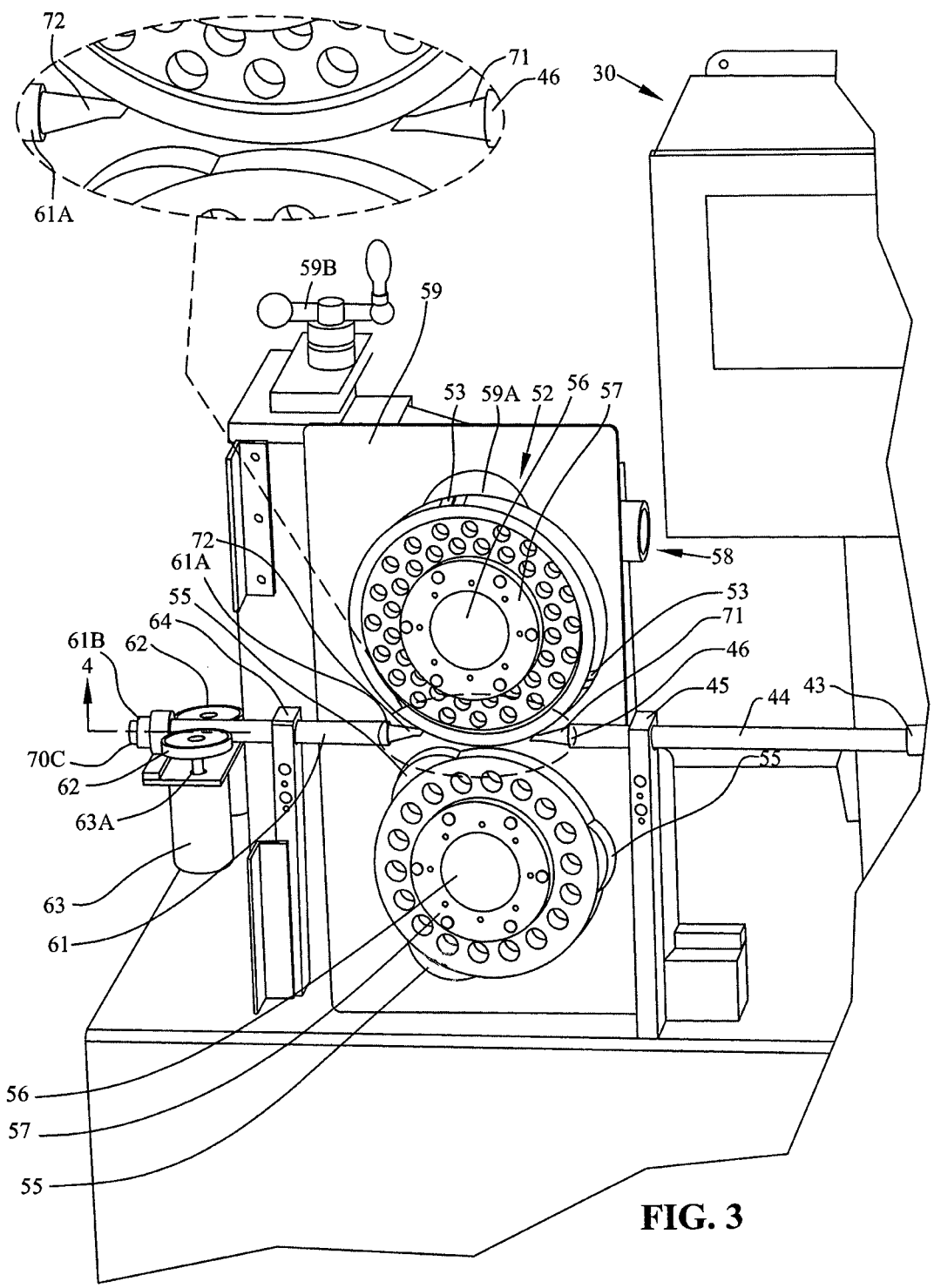
FIG. 3 is an enlarged perspective view of the cutting station and extracting assembly that are features of the apparatus for cutting tubular members shown in FIG. 1.

In the embodiment shown, guide 40 includes a funnel 41 having its larger first end 42 positioned farther from cutting station 50 than its smaller second end 43. Second end 43 attaches to tube 44 which extends through a bracket 45 adjacent cutting station 50. An end 46 of tube 44 terminates adjacent the components used for cutting the tubular member as shown in FIG. 3 and as described in greater detail below.

Figure 2:
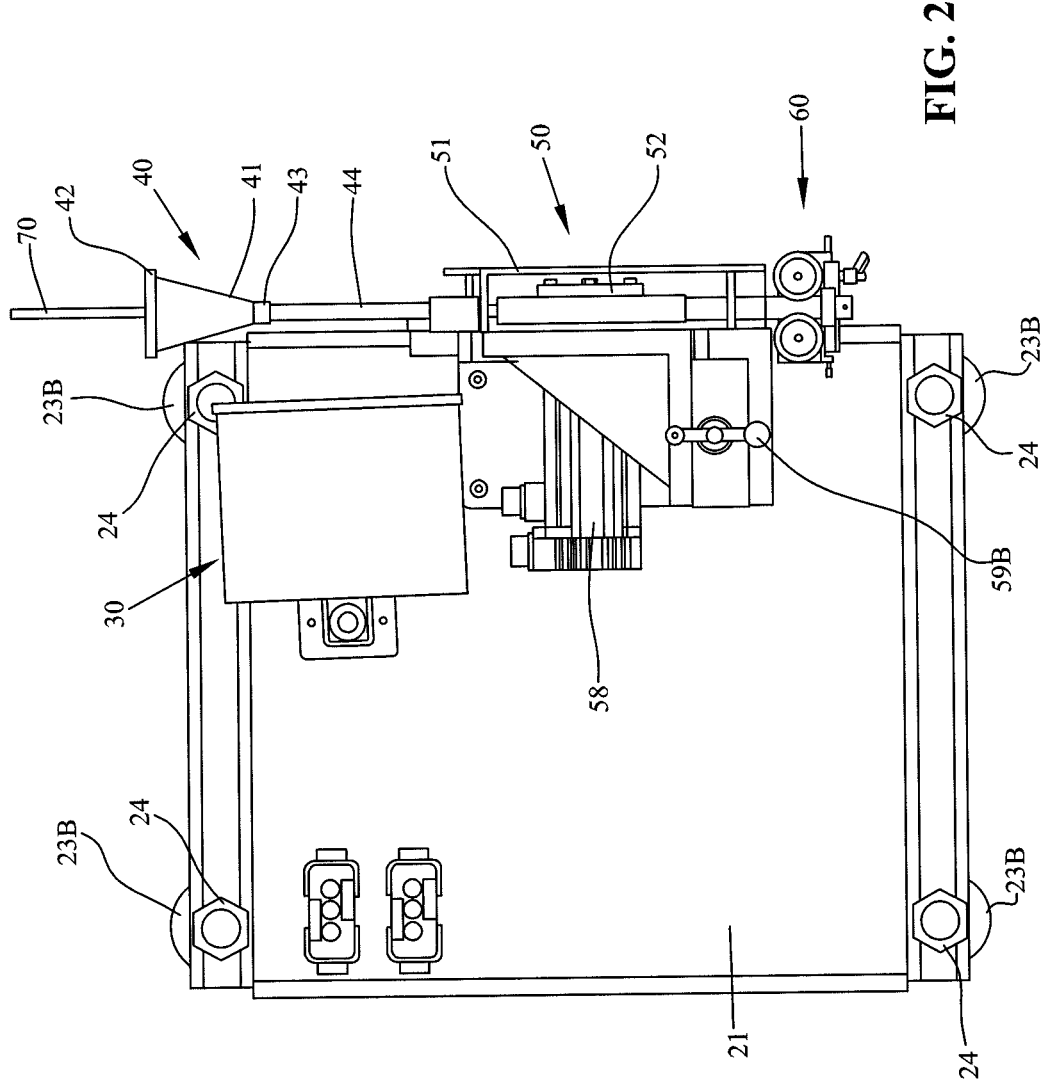
FIG. 2 is a top plan view of the apparatus for cutting tubular members shown in FIG. 1.

Cutting station 50 includes a cover 51 (shown as transparent in FIGS. 1 and 2). FIG. 3 shows cutting station 50 with cover 51 removed. As shown in FIG. 3, cutting station 50 includes a first wheel 52 having a plurality of cutting members 53 disposed about the circumference thereof. In the embodiment shown, wheel 52 includes three cutting members 53 (two of which are shown in FIG. 3) spaced equally around the circumference, i.e., 120° apart. In the embodiment shown, cutting member 53 is a substantially flat, straight die similar to those known for use in die cutting boxes and other flat paper products. In one embodiment of the invention, cutting members 53 are placed within recesses (not shown) in wheel 52 sized to accommodate cutting members 53. Cutting members 53 may be secured to wheel 52 in a number of manners. In one embodiment, cutting members 53 are secured to wheel 52 by magnets placed beneath or adjacent the recesses or otherwise positioned in or near wheel 52. Cutting station 50 also includes a second wheel 54 that includes a plurality of lobes or projections 55 spaced equally around the circumference of wheel 54. The cutting station 50 includes the same number of cutting members 53 and projections 55 spaced at the same interval about the circumference of wheels 52 and 54. The wheels 52 and 54 are secured to shafts 56 by collars 57. Shafts 56 are coupled to the drive shaft of drive mechanisms 58. Although various drive mechanisms 58 can be used, one embodiment of the present invention utilizes two servo motors to rotate wheels 52 and 54. The various components of cutting station 50 are secured to base 20 and supported thereon by support structure 59. Note that a portion of support structure 59 includes an elongated opening 59A. Support structure 59 also supports a rotatable handle 59B. Handle 59B is mechanically coupled to a slide mechanism (not shown) such that rotating handle 59B moves wheel 52 vertically. Opening 59A accommodates movement of wheel 52 and its associated shaft 56.

Figure 4:
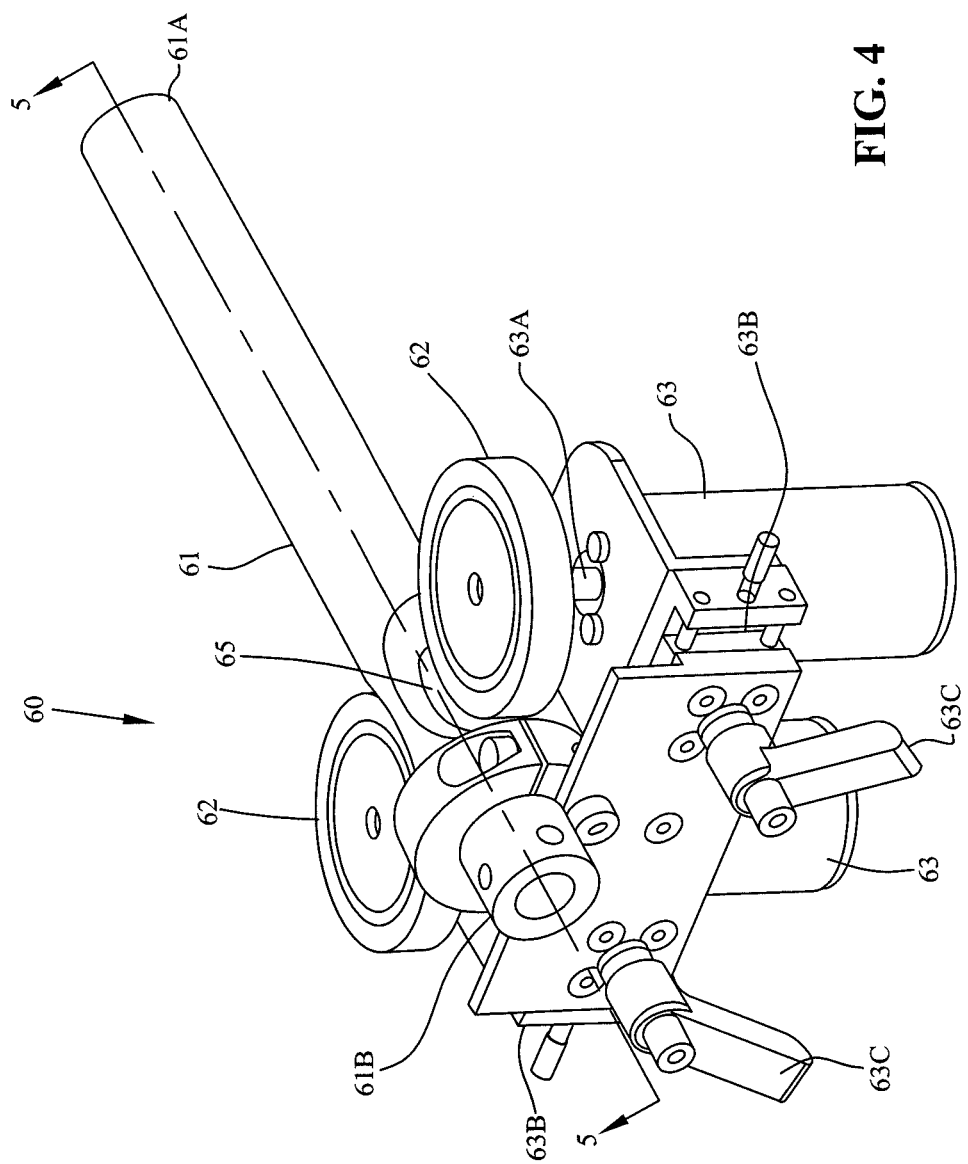
FIG. 4 is a perspective view of the extracting assembly shown in FIG. 3.

Extracting assembly 60 generally includes a tube 61 and a pair of gripping members 62 driven by drive mechanism 63. In the embodiment shown, gripping members 62 are horizontally mounted wheels driven by drive members 63. Drive members 63 can be any of a number of known mechanisms capable of rotating gripping members 62 on shafts 63A. Tube 61 extends through bracket 64 as shown in FIG. 3 and includes a first end 61A and a second end 61B. As shown in FIG. 4, tube 61 includes a plurality of openings 65 into which gripping members 62 extend to engage the cut tubular member as described in greater detail below. Extracting assembly 60 also includes a pair of slide mechanisms 63B and handles 63C (FIG. 4). Rotating handles 63C causes slide mechanisms 63B to move toward or away from tube 61, thereby moving gripping members 62 further into or out of openings 65. Handles 63C can be provided with a locking mechanism, such as a set screw.

Referring to FIGS. 4-7, tube 61 includes a first interior section 66A, a second interior section 66B, a third interior section 66C, a fourth interior section 66D and a fifth interior section 66E. Section 66A tapers as shown from first end 61A toward second end 61B of tube 61. Second interior section 66B likewise tapers in the same direction. A pair of grooves 67 are formed in interior sections 66A, 66B and 66C and have a first end 67A and a second end 67B. Grooves 67 decrease in height and depth from end 67A toward end 67B, eventually terminating in section 66C.

In use, tubing cutter 10 is utilized to cut a tubular member 70 as it is continuously fed into the cutting station 50. In particular, tubing cutter 10 can be used to cut a continuously extruded tubular member in to sections to produce various items, such as drinking straws. In operation, the tubular member 70 is fed into end 42 of funnel 41, guided through tube 44 and exits end 46 adjacent wheels 52 and 54 as shown in FIG. 3. Control system 30 is utilized to rotate wheels 52 and 54 such that when cutting member 53 engages tubular member 70 to cut it, projections 55 are positioned beneath cutting members 53. The cutting portion of cutting member 53 extends through tubular member 70 sufficiently to cut it without contacting projection 55. The rotation of wheels 52 and 54 are controlled such that the tangential speed of the cutting portion of cutting members 53 is the same as the linear velocity of the tubular member 70 being cut when the cut is made. The length of the cut section of tubular member 70 can be varied in a number of ways. For example, utilizing more than three cutting members 53 and projections 55 would result in shorter cut segments having a shorter length. In an alternative embodiment, wheels 52 and 54 do not rotate at a constant speed. Rather, they could be stopped between cuts and then rotated to produce different length cut tubular members. Alternatively, their speeds could be accelerated or decelerated between cuts and accelerated or decelerated such that the speed of cutting member 53 matches the speed of tubular member 70 at the desired time to produce a cut segment of desired length.

FIG. 8 is a perspective view of a cut segment 70A of tubular member 70 before it has passed through extracting assembly 60. As shown in FIG. 3, when certain materials are cut, the cut ends 71 and 72 can be flattened during the cutting process. After the cut is made, end 71 enters end 61A of tube 60. The tapered configuration of the interior sections of tube 61 guide end 71 such that it engages grooves 67 at ends 67A, which is sized and configured to be wider and higher than end 71. As end 71 rides in grooves 67, it is forced open by the tapered configuration of the decreasing depth of grooves 67. Thus, the end 71 is open and substantially circular when the cut segment 70A exits tube 61 at end 61B. Note grooves 67 also open trailing end 72 of the cut segment 70A in a similar fashion. Depending on the material from which tubular member 70 is made, the speeds at which the cut segments 70 travel through tube 61 and the number of cut segments processed, grooves 67 can eventually wear and no longer serve their intended purpose. Accordingly, it may be desirable to make tube 61 from a relatively hard, wear resistant material, such as 440C stainless steel. Other materials can also be used. Alternatively, softer materials can be used but tube 61 may need to be replaced more frequently.

As end 71 reaches opening 65, gripping members 62 engage cut segment 70A and eject it from end 61B. Note that end 61B includes a plurality of openings 61C. If desired, a guide tube can be inserted in to interior section 66E and secured in place by inserting bolts or other fasteners through openings 61C. The guide tube can be used to further direct the path of travel of cut segments 70A.

Although the present invention has been shown and described in detail, the same is for purposes of illustration only and is not a limitation on the invention. Numerous modifications to the invention can be made. For example, the locations of wheels 52 and 54 can be reversed. Handle 59B could be replaced with a motor or other automated means for moving wheel 52. Wheel 52 could be stationary and wheel 54 moveable, or both could be moveable. The length and inner configuration of tube 61 can also be changed based on the product being cut. Various guide mechanisms other than funnel 41 and tube 44 can also be used. It is also not necessary that tubing cutter 10 be movable. Rather, cutting station 50 and extracting assembly 60 can be secured to a stationary structure.

I claim:

1. An apparatus for cutting a continuous hollow tubular member having a fully expanded configuration with an outer diameter D, including:
   a support structure;
   a control system;
   a cutting station;
   a guide for directing the continuous hollow tubular member to the cutting station in the fully expanded configuration;
   the cutting station having a first wheel having at least one cutting member located on the circumference of the first wheel and a second wheel having at least one projection located on the circumference of the second wheel, the cutting member positioned and configured to cut the continuous hollow tubular member into a plurality of hollow tubular members, each of which has a first flattened end, a second flattened end and a section located between the first flattened end and the second flattened end, the section located between the first flattened end and the second flattened end having an outer diameter D; and
   an extracting assembly having a cylindrical member having a first end, a second end, a first interior section tapering from the first end toward the second end, a second interior section tapering from the end of the first interior section toward the second end of the cylindrical member, a third interior section extending from the end of the second interior section toward the second end of the cylindrical member and a pair of grooves for engaging the first and second flattened ends of the plurality of hollow tubular members and expanding them to the fully expanded configuration such that the first and second ends of the plurality of hollow tubular members have an outer diameter D, the pair of grooves extending from the first interior section to the third interior section and decreasing in height and depth from the first interior section to the third interior section.

2. The apparatus of claim 1, wherein the first wheel includes a plurality of cutting members spaced equally around the circumference of the first wheel and the second wheel includes the same number of projections spaced equally around the circumference of the second wheel.

3. The apparatus of claim 1, wherein the cutting members are dies.

4. The apparatus of claim 1, wherein the first wheel includes at least one recess and the cutting members are located in the recesses.

5. The apparatus of claim 1, wherein the cutting members are secured to the first wheel by magnets.

6. The apparatus of claim 1, further including means for adjusting the distance between the center of the first wheel and the center of the second wheel.

7. The apparatus of claim 6, wherein the means for adjusting includes a slide mechanism coupled to the first wheel.

8. The apparatus of claim 1, wherein the extracting assembly further includes at least one gripping member for ejecting the plurality of hollow tubular members from the cylindrical member.

9. The apparatus of claim 8, wherein the gripping member includes at least one wheel.

10. The apparatus of claim 1, wherein the extracting assembly further includes at least one opening in the cylindrical member and at least one gripping member extending into the opening for ejecting the plurality of hollow tubular members from the cylindrical member.

11. The apparatus of claim 1, wherein the extracting assembly further includes first and second openings in the cylindrical member, a first wheel extending into the first opening for ejecting the plurality of tubular members from the cylindrical member and a second wheel extending into the second opening for ejecting the plurality of tubular members from the cylindrical member.

12. The apparatus of claim 11, further including means for adjusting the distance between the center of the first wheel and the center of the second wheel.

13. The apparatus of claim 12, wherein the means for adjusting includes at least one slide mechanism coupled to at least one of the first and second wheels.

14. An apparatus for cutting a continuous hollow tubular member having a fully expanded configuration with an outer diameter D, including:
   a cutting station configured to cut the continuous hollow tubular member into a plurality of hollow tubular members, each of which has a first flattened end, a second flattened end and a section located between the first flattened end and the second flattened end, the section located between the first flattened end and the second flattened end having an outer diameter D; and
   an extracting assembly for ejecting the plurality of hollow tubular members from the apparatus, the extracting assembly including at least one groove for expanding the first and second flattened ends of the plurality of hollow tubular members to the fully expanded configuration such that the first and second ends of the plurality of hollow tubular members have an outer diameter D.

15. The apparatus of claim 14, wherein the extracting assembly includes a cylindrical member having a first end and a second end and the groove is locate in the cylindrical member.

16. The apparatus of claim 14, wherein the height of the groove decreases along the length of the groove.

17. The apparatus of claim 14 wherein the depth of the groove decreases along the length of the groove.

18. The apparatus of claim 15, wherein the cylindrical member includes at least one interior section tapering from the first end toward the second end.

19. The apparatus of claim 15, wherein the cylindrical member includes first interior section tapering from the first end toward the second end and a second interior section tapering from the end of the first interior section toward the second end of the cylindrical member.

20. The apparatus of claim 15, wherein the extracting assembly includes at least two grooves disposed on opposite sides of the interior of the cylindrical member.

21. The apparatus of claim 14, wherein the cutting station further includes a first wheel having a center and at least one cutting member located thereon, a second wheel having a center and at least one projection located thereon and means for adjusting the distance between the center of the first wheel and the center of the second wheel.

22. The apparatus of claim 21, wherein the means for adjusting includes a slide mechanism coupled to the first wheel.

* * * * *